(12) United States Patent
Buck et al.

(10) Patent No.: US 7,782,626 B2
(45) Date of Patent: Aug. 24, 2010

(54) PORTABLE POWER DRIVEN SYSTEM WITH BATTERY ANTI-THEFT APPARATUS

(75) Inventors: John E. Buck, Cockeysville, MD (US); Jeffrey P. Grant, Forest Hill, MD (US)

(73) Assignee: Black & Decker Inc., Newark, DE (US)

(*) Notice: Subject to any disclaimer, the term of this patent is extended or adjusted under 35 U.S.C. 154(b) by 838 days.

(21) Appl. No.: 11/701,893

(22) Filed: Feb. 2, 2007

(65) Prior Publication Data

US 2008/0186686 A1    Aug. 7, 2008

(51) Int. Cl.
*H05K 7/00*     (2006.01)
(52) U.S. Cl. .................................. 361/747; 361/801
(58) Field of Classification Search .............. 361/747, 361/807, 810, 801–803
See application file for complete search history.

(56) References Cited

U.S. PATENT DOCUMENTS

| | | |
|---|---|---|
| 2,526,671 A | 10/1950 | Kober |
| 2,791,898 A | 5/1957 | Pegg et al. |
| 3,366,869 A | 1/1968 | Young |
| 3,752,254 A | 8/1973 | Carley et al. |
| 3,826,115 A | 7/1974 | Davis |
| 3,908,161 A | 9/1975 | Messenger |
| 4,122,354 A | 10/1978 | Howland |
| 4,191,034 A | 3/1980 | Froess et al. |
| 4,249,403 A | 2/1981 | Littlejohn |
| D278,425 S | 4/1985 | Toshihiko |
| 4,535,863 A | 8/1985 | Becker |
| 4,743,777 A | 5/1988 | Shilling et al. |
| 4,772,802 A | 9/1988 | Glennon et al. |
| 4,786,852 A | 11/1988 | Cook |
| 4,830,412 A | 5/1989 | Raad et al. |
| 4,883,973 A | 11/1989 | Lakey et al. |
| 4,947,100 A | 8/1990 | Dhyanchand et al. |
| 4,965,477 A | 10/1990 | Stadler et al. |
| 5,012,177 A | 4/1991 | Dhyanchand |
| 5,013,929 A | 5/1991 | Dhyanchand |
| 5,038,095 A | 8/1991 | Kirchberg et al. |
| 5,052,198 A * | 10/1991 | Watts .......................... 70/58 |
| 5,065,086 A | 11/1991 | Takakado |
| 5,091,679 A | 2/1992 | Murty et al. |
| 5,132,604 A | 7/1992 | Shimane et al. |
| 5,175,439 A | 12/1992 | Harer et al. |
| 5,212,952 A | 5/1993 | Yokoyama et al. |
| 5,325,042 A | 6/1994 | Murugan |
| 5,689,174 A | 11/1997 | Pacheco, Sr. |
| 5,751,070 A | 5/1998 | Nagao et al. |

(Continued)

FOREIGN PATENT DOCUMENTS

DE         29821825         12/1998

(Continued)

*Primary Examiner*—Hung S Bui
(74) *Attorney, Agent, or Firm*—Harness, Dickey & Pierce, P.L.C.

(57) ABSTRACT

A portable power driven system has a battery started engine and a receptacle for receiving a battery pack. An arm is disposed on the portable power driven system and is movable between a locked position where it blocks the battery pack from being removed from the receptacle and an unlocked position where it does not block the battery pack from being removed from the receptacle.

26 Claims, 8 Drawing Sheets

U.S. PATENT DOCUMENTS

| | | |
|---|---|---|
| 5,920,161 A | 7/1999 | Obara et al. |
| 5,929,537 A | 7/1999 | Glennon |
| 5,998,976 A | 12/1999 | Steffan |
| 6,008,545 A | 12/1999 | Nagano et al. |
| 6,137,251 A | 10/2000 | Huang et al. |
| 6,200,277 B1 | 3/2001 | Kensey |
| 6,202,776 B1 | 3/2001 | Masberg et al. |
| 6,260,578 B1 | 7/2001 | Kuehnemund et al. |
| 6,265,091 B1 | 7/2001 | Pierson et al. |
| 6,313,543 B1 | 11/2001 | Frank |
| 6,380,719 B2 | 4/2002 | Underwood et al. |
| 6,600,136 B1 | 7/2003 | Morris et al. |
| 6,639,370 B1 | 10/2003 | Gabrys |
| 6,653,815 B2 | 11/2003 | Watson et al. |
| D489,327 S | 5/2004 | Imai |
| D507,529 S | 7/2005 | Lee |
| 6,998,725 B2 | 2/2006 | Brandenburg et al. |
| D516,508 S | 3/2006 | Johnson |
| D519,923 S | 5/2006 | Imai et al. |
| 7,053,497 B2 | 5/2006 | Sodemann et al. |
| 7,180,200 B2 * | 2/2007 | Walter et al. ................ 290/1 A |
| 2004/0080300 A1 | 4/2004 | Xu et al. |
| 2006/0170218 A1 | 8/2006 | Grant et al. |
| 2006/0231644 A1 * | 10/2006 | Breedlove et al. ........... 239/398 |
| 2007/0120366 A1 | 5/2007 | Grant et al. |

FOREIGN PATENT DOCUMENTS

| | | |
|---|---|---|
| EP | 0338512 | 10/1989 |
| EP | 488108 | 6/1992 |
| EP | 1138938 | 10/2001 |
| WO | WO 9821805 | 5/1998 |

\* cited by examiner

PORTABLE POWER DRIVEN SYSTEM WITH BATTERY ANTI-THEFT APPARATUS

FIELD

This disclosure relates generally to portable power driven systems having engines having a battery powered starter. More particularly, the disclosure relates to a theft prevention apparatus for a removable, portable universal battery pack used to start an internal combustion (IC) engine of a portable power driven system.

BACKGROUND

Portable power driven systems of the type described herein have an engine that drives an output device. Often the engines are battery started. That is, a lead acid battery is used to power a starter motor that starts the engine. For example, one such type of portable power driven system is a portable generator having an internal combustion engine that drives an alternator. In the latest portable generator technology, the alternator is replaced with a smaller and lighter permanent magnet generator (PMG) and an electronic power converter. In normal operation, the IC engine directly drives the PMG which then produces electrical power. This variable frequency (engine speed dependent), variable voltage power is then converted electronically to a constant voltage, constant frequency output, for example a 120 VAC, 60 Hz output. Typically, a PMG includes a single set of windings that are used to produce the electrical power output of the portable generator.

In one example, as disclosed in commonly owned patent application U.S. Ser. No. 11/526,825 filed Sep. 25, 2006 for Starter System For Portable Internal Combustion Engine Electric Generators Using A Portable Universal Battery Pack, the entire disclosure of which is incorporated by reference herein, a portable generator is provided that utilizes a removable/portable universal battery pack adapted for use with various other DC powered tools to start the engine of the portable power driven system, thereby eliminating the need for the fixed lead-acid battery and making the generator lighter in weight and more manageable to maneuver.

It would be desirable to protect the universal battery pack from theft when installed in the generator.

SUMMARY

In accordance with an aspect, a portable power driven system has a battery started engine and a receptacle for receiving a battery pack. An arm is disposed on the portable power driven system and is movable between a locked position where it blocks the battery pack from being removed from the receptacle and an unlocked position where it does not block the battery pack from being removed from the receptacle.

Further areas of applicability of the present invention will become apparent from the detailed description provided hereinafter. It should be understood that the detailed description and specific examples, while indicating the preferred embodiment of the present teachings, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application or uses.

Figure 1:
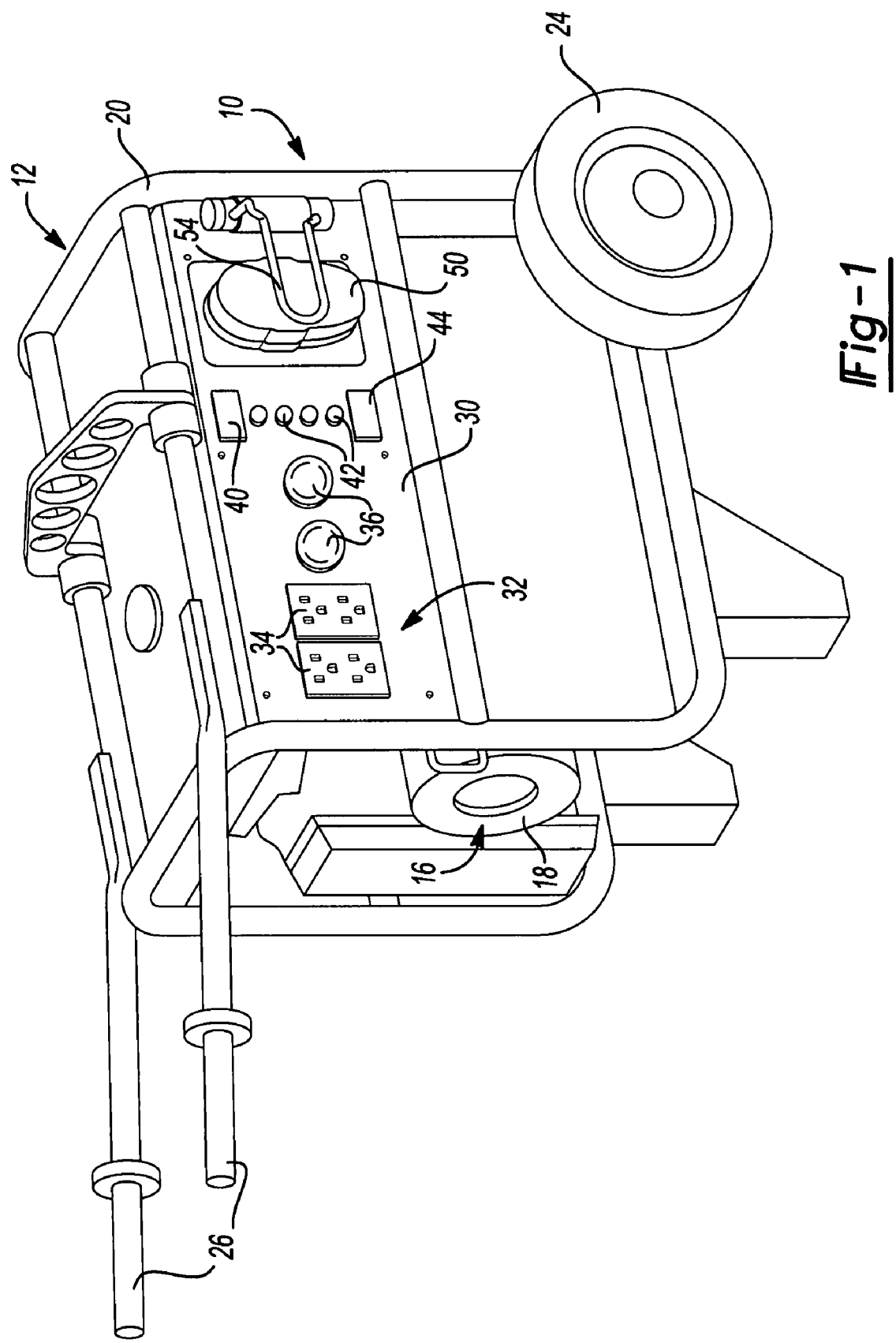
FIG. 1 is a perspective view of a portable electric generator having a locking apparatus that blocks removal of a battery pack from a receptacle when in a locked position.

With initial reference to FIG. 1, a portable power driven system having a locking apparatus 10 for preventing removal of a battery pack from a receptacle when in a locked position is initially described with reference to an exemplary power driven system in the form of a portable generator system 12. The portable generator system 12 can have an electric generator device 16 (indicated with reference numeral 16 but otherwise hidden from view in FIG. 1) for generating AC power. Electric generator device 16 is coupled to an output shaft of an internal combustion engine 18 and is driven by internal combustion engine 18. Portable generator system 12 is sufficiently light that it can be manually moved from one place to another. Portable generator system 12 can include a frame 20 that supports the internal combustion engine 18 and electric generator device 16. The frame 20 may illustratively have wheels 24 and handles 26 to facilitate manually moving portable generator system 12. The electric generator device 16 can generate AC power as described above. The AC power may illustratively be 120 VAC (or 110 or 115 VAC) and may also illustratively be 240 VAC (or 220 or 230 VAC). It may be 60 Hz, or may be 50 Hz.

Portable generator system 12 can further include a control panel 30. The control panel 30 can include AC outlets 32. The AC outlets 32 illustratively include ground fault interrupter outlets 34 and twist-lock outlets 36. Control panel 30 can also include on/off/start switch 40, circuit breakers 42, and an idle speed control switch 44. Control panel 30 can further include a battery receptacle 48 (FIG. 3) electrically coupled to an electrically powered starting device for starting internal combustion engine 18, such as the starting devices described above.

Figure 11:
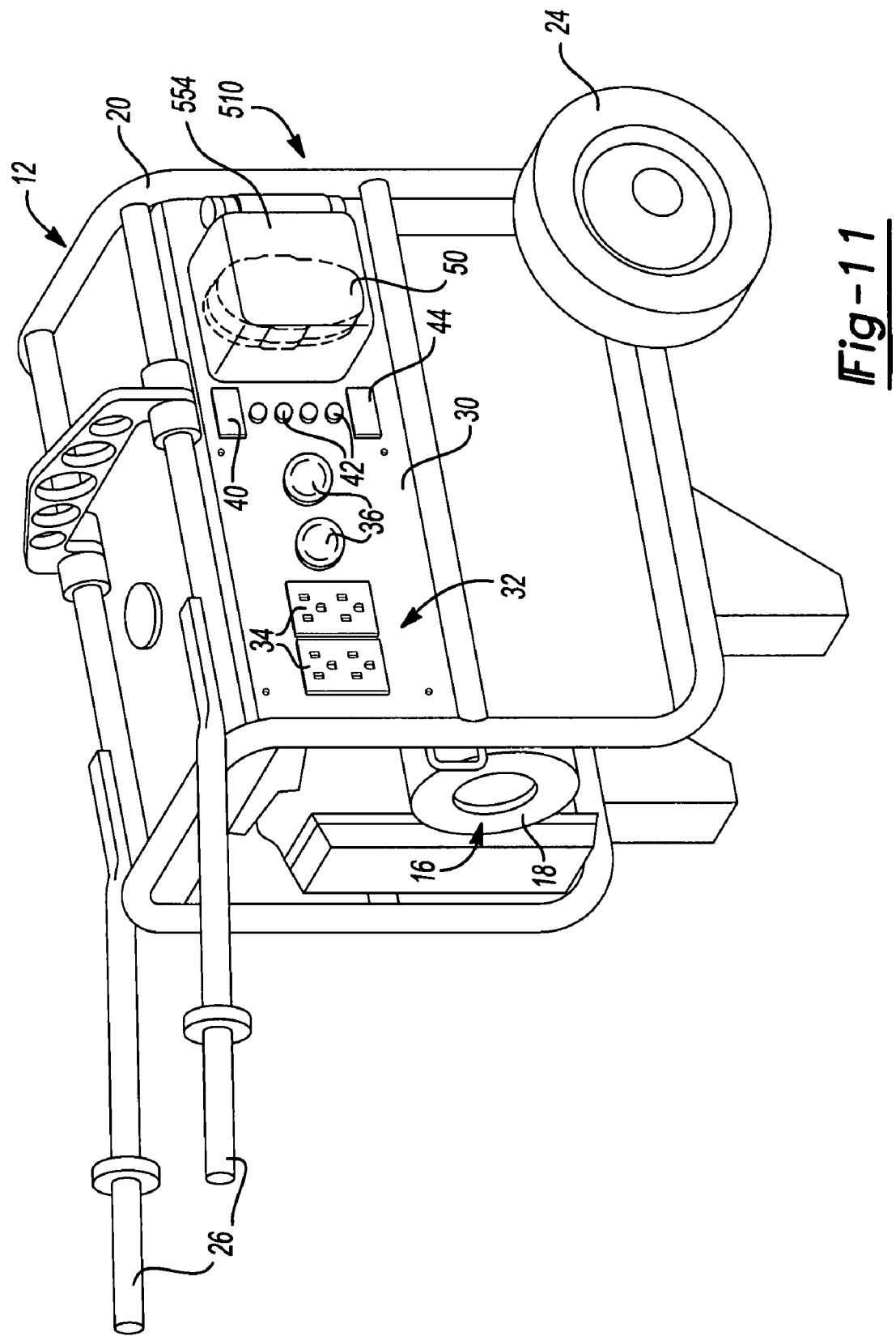
FIG. 11 is a perspective view of a portable electric generator having a locking apparatus according to additional features.

Battery receptacle 48 may illustratively be a "foot" of a cordless power tool that receives a battery pack, such as a battery pack 50 (FIG. 11). As used herein, a "foot" of a cordless power tool is that portion of the power tool, typically part of the power tool's housing, that is configured to receive a battery pack. For example, battery pack 50 may be a battery pack for the DEWALT series of 18 volt cordless power tools and battery receptacle 48 would then illustratively be materially the same as the foot of these power tools, such as the DEWALT DW959K-2 drill. It should be understood, however, that battery receptacle 48 could be the foot of any cordless power tool that uses a removable battery pack.

Battery receptacle 48 is configured to receive a battery pack from a cordless power tool, such as battery pack 50. In this regard, battery receptacle 48 may be configured to receive a tower type of battery pack, such as battery pack 50. Battery receptacle 48 may alternatively be configured to receive a rail type of battery pack, such as the battery pack identified with reference numeral 16 in commonly owned U.S. Pat. No. 6,653,815, the disclosure of which is incorporated herein in its entirety by reference. As such, battery receptacle 48 has a configuration similar to that on the foot of tool 10 of U.S. Pat. No. 6,653,815. That is, battery receptacle 48 includes a pair of grooves that receives guide rails of the rail type battery pack. It also includes a connector configured to mate with the terminal block of the rail type battery pack.

In use, a battery pack, such as battery pack 50, from a cordless power tool can be placed in battery receptacle 48 and provide electrical power to start internal combustion engine 18. Internal combustion engine 18 may have a pull start that can be used to start internal combustion engine 18 as well as the electrical starter circuit described above. The pull start could then be used to start internal combustion engine 18 when the battery pack 50 is discharged. Additional details of the configuration and operation of the portable generator system 12 may be found in the above referenced commonly owned, co-pending U.S. Ser. No. 11/526,825.

Figure 2:
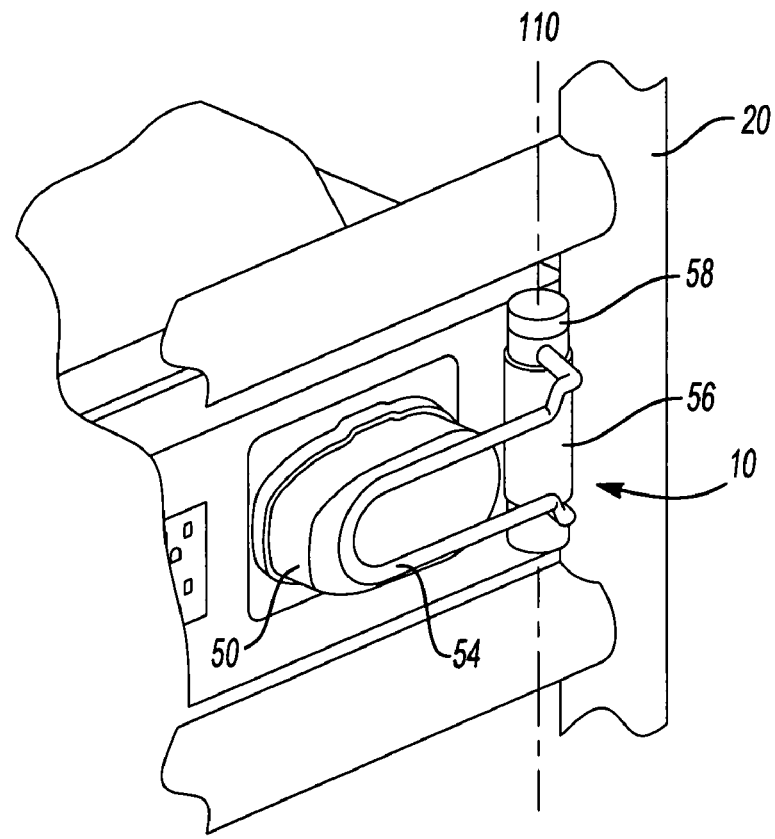
FIG. 2 is a perspective view of the locking apparatus of FIG. 1 shown in a locked position.
Figure 3:
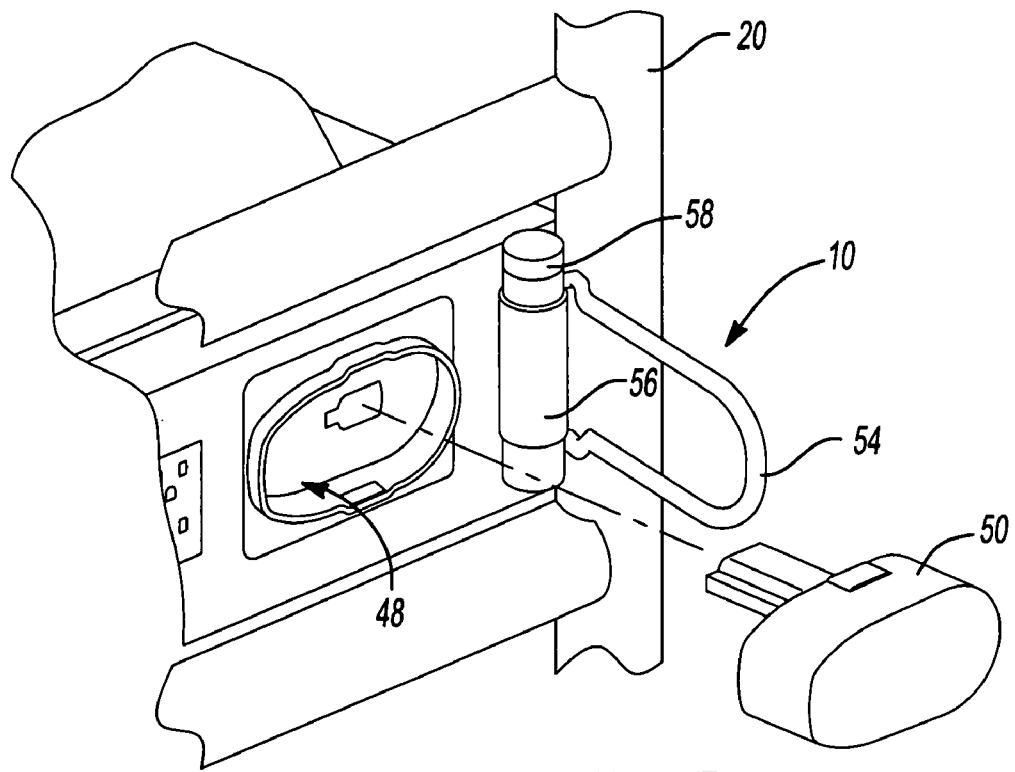
FIG. 3 is a perspective view of the locking apparatus of FIG. 1 shown in an unlocked position with the battery pack removed from the battery receptacle.
Figure 4:
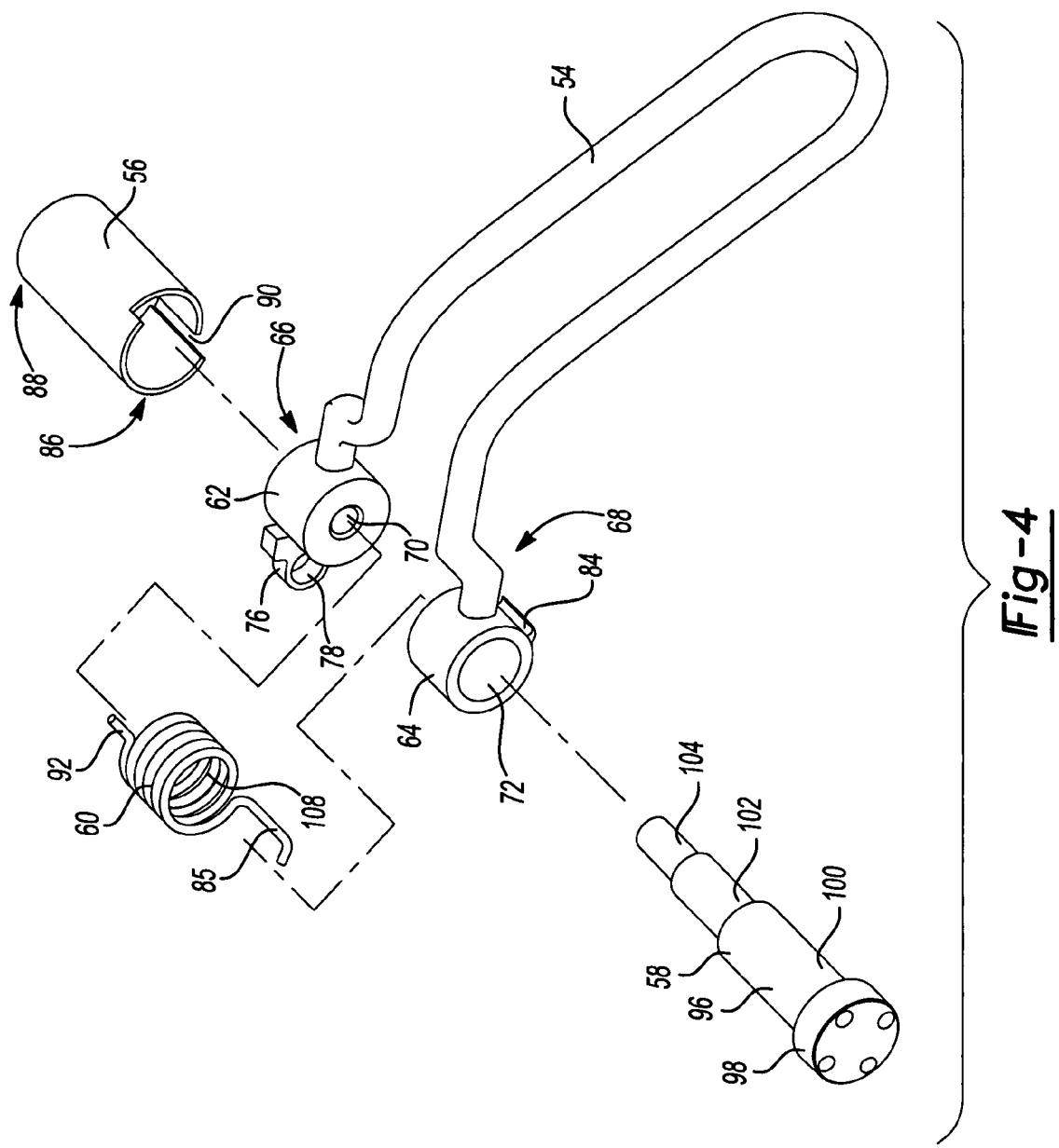
FIG. 4 is an exploded perspective view of the locking apparatus.
Figure 5:
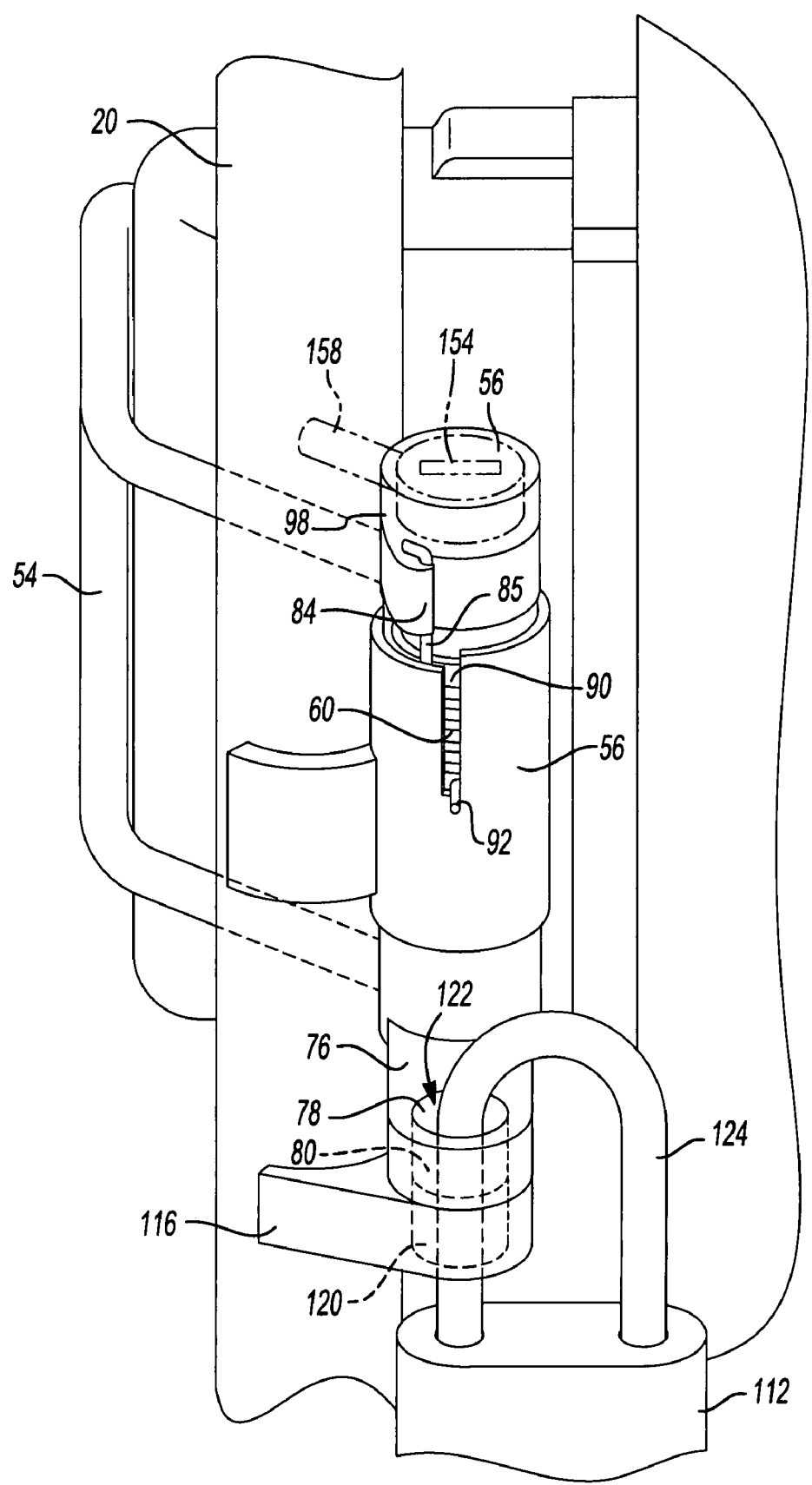
FIG. 5 is a side perspective view of the locking apparatus shown with an exemplary lock passed through complementary locking members.
Figure 6:
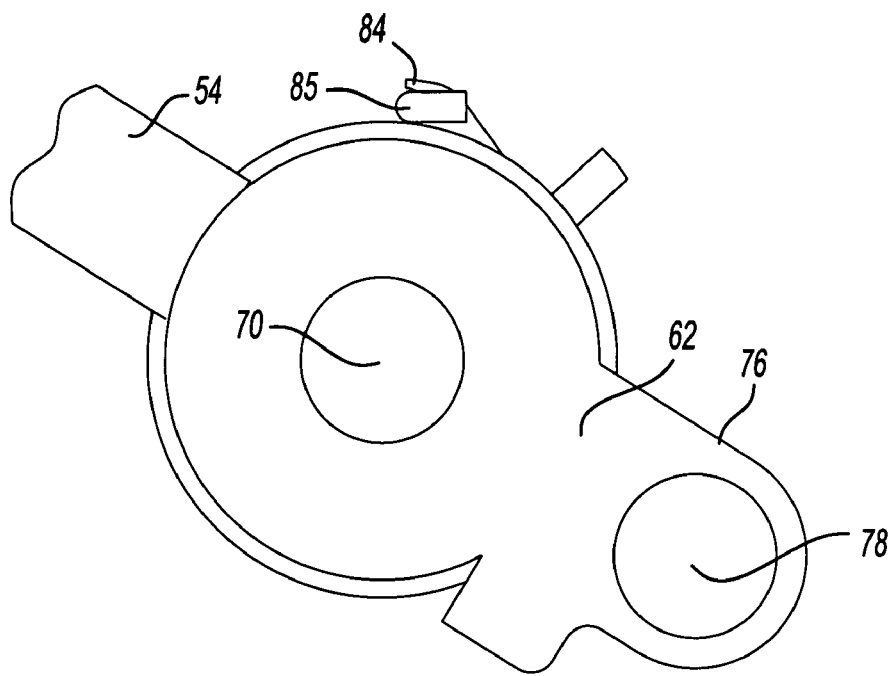
FIG. 6 is a plan view of a portion of the locking apparatus shown in the locked position.

Turning now to FIGS. 2-4, the locking apparatus 10 will be described in greater detail. The locking apparatus 10 can include an arm 54, a sleeve 56, a shaft 58, and a biasing member 60 (FIG. 4). The arm 54 can be generally U-shaped and have knuckles 62, 64 at opposite first and second ends 66, 68. The arm 54 may illustratively have a generally tubular cross-sectional profile. The knuckles 62, 64 may define a first and second coaxial passages 70 and 72. A first locking member 76 may be formed on the first end 66 of the arm 54. In one example, the first locking member 76 may be in the form of an eyelet 78 defining a passage 80 (FIG. 5). The second end 68 of the arm 54 may define a catch 84 adapted to secure an end 85 of the biasing member 60, as will be described.

The sleeve 56 may illustratively have a tubular body having a first end 86 and a second end 88. The first end 86 may include a notch 90 for securably accepting an opposite end 92 of the biasing member 60. According to one example, the sleeve 56 may be securably attached to the portable generator system 12. In the example shown, the sleeve 56 may be welded or otherwise secured to the frame 20 of portable generator system 12.

The shaft 58 may illustratively have a longitudinal cylindrical body 96. In one example, the longitudinal cylindrical body 96 may include a head 98, and first, second and third stepped portions 100, 102 and 104, respectively. The biasing member 60 may be a coil spring having the first end 92 and the second end 85 and defining an opening 108. Alternately, the biasing member 60 may be other types of biasing devices, such as resilient members, tensions springs, or the like. In an assembled position, the shaft 58 is adapted to pass through the second passage 72 of the arm 54, the opening 108 of the biasing member 60, the sleeve 56, and the first passage 70 of the arm 54. In this way, the first stepped portion 100 is received in the second passage 72 of the arm 54, the second stepped portion 102 is received in the sleeve 56 and the biasing member 60, and the third stepped portion 104 is received in the first passage 70 of the arm 54.

Figure 7:
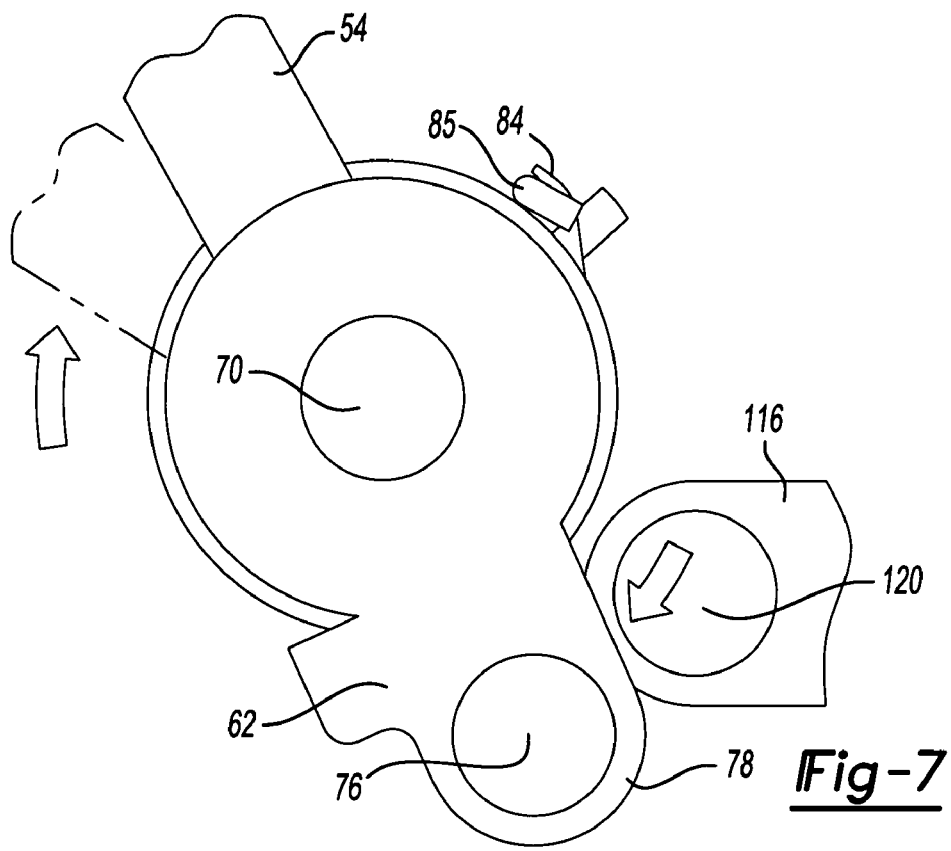
FIG. 7 is the plan view of FIG. 6 shown with a locking arm of the locking apparatus rotated toward the unlocked position.

With specific reference to FIGS. 2, 3, 6, and 7, the locking apparatus 10 can define a pivot axis 110 through the sleeve 56. As can be appreciated, the arm 54 can be adapted to pivot from the locked position (FIGS. 2, 5 and 6), in a direction counter-clockwise about the pivot axis 110 to the unlocked position (FIGS. 3 and 7). Because the sleeve 56 is fixedly attached to the frame 20, the sleeve 56 serves as a guide for controlling pivotal movement of the arm 54 about the pivot axis 110. In the particular example shown, the pivot axis 110 may be generally transverse to ground.

Turning now to FIG. 5, the locking apparatus 10 is shown in the locked position with an exemplary lock 112 passed through the first locking member 76 of the arm 54 and a second locking member 116 fixedly disposed on the frame 20. The second locking member 116 may be welded to the frame 20 and have a second eyelet 120. In the locked position, the respective eyelets 78, 120 of the first and second locking members 76 and 116 align to form a continuous passage 122 for accepting a hook shaft 124 of the lock 112. As can be appreciated, with the hook shaft 124 of the lock 112 passed through the continuous passage 122, the first locking member 76 is precluded from rotating thus preventing arm 54 from rotating. As a result, the arm 54 prevents battery pack 50 from being removed from receptacle 48 and discourages theft of the battery pack 50.

As illustrated in FIG. 5, the first end 92 of the biasing member 60 can slidably nest within the notch 90 of the sleeve 56. The second end 85 of the biasing member 60 can cooperate with the catch 84 formed on the second end 68 of the arm 54. In this way, the biasing member 60 urges the arm 54 toward the locked position (or clockwise as viewed in FIG. 5). In another example, a key-lock 154 and deadbolt 158 combination may be provided instead of or in addition to the lock 112. In this way, an integrated or self-contained locking arrangement may be provided.

Figure 8:
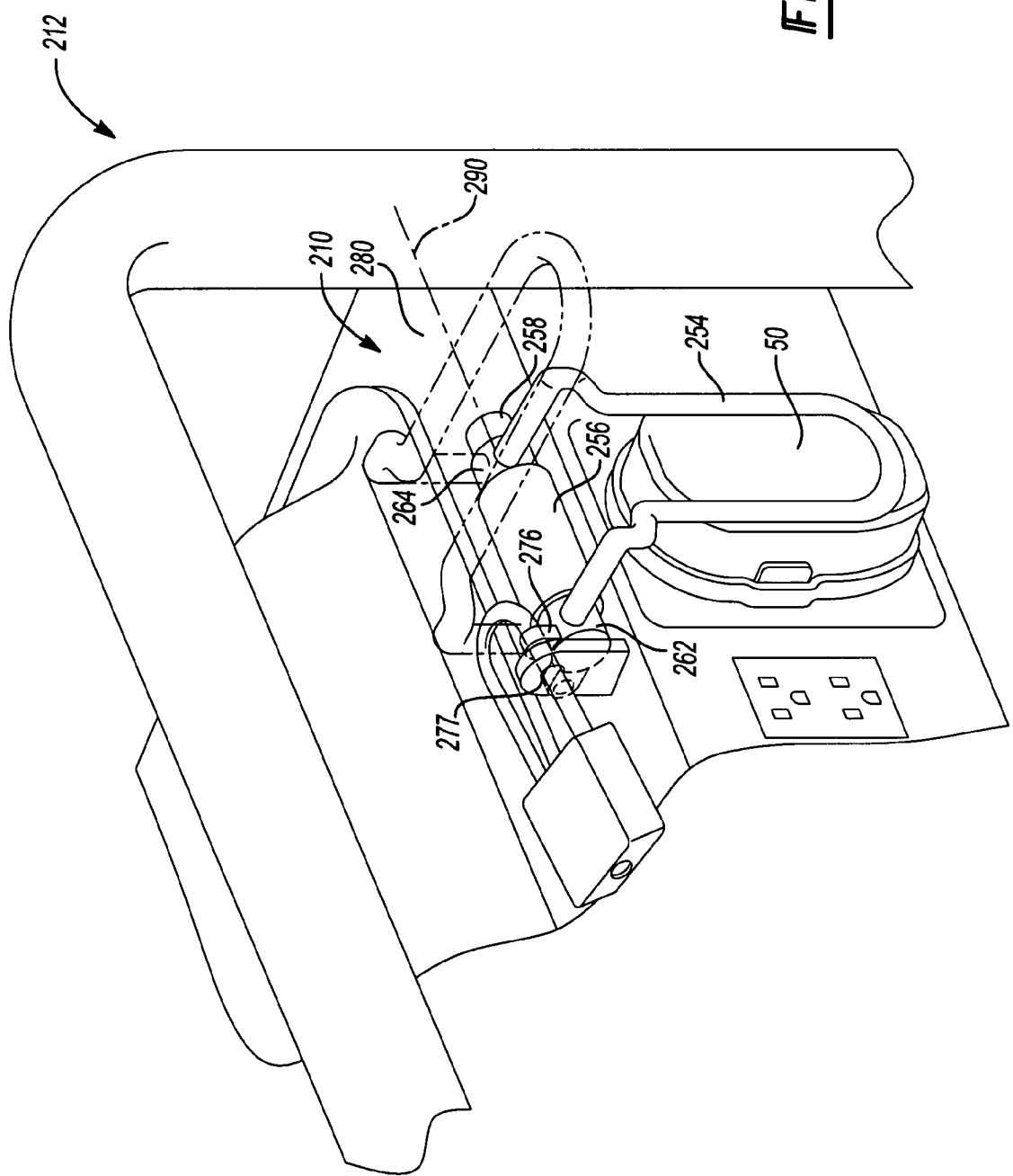
FIG. 8 is a perspective view of variation of the locking apparatus of FIG. 1.

Turning now to FIG. 8, a portable generator system 212 having a locking apparatus 210 according to additional features is shown. The locking apparatus 210 can include an arm 254, a sleeve 256, and a shaft 258. While not specifically shown, the locking apparatus 210 may additionally include a biasing member, such as the biasing member discussed above. The arm 254 may illustratively be generally U-shaped and have knuckles 262 and 264 at opposite first and second ends. The arm 254 may have a generally tubular cross-sectional profile. A first locking member 276 may be formed on the first end of the arm 254. In one example, the first locking member 276 may be in the form of a first eyelet defining a first passage. A second locking member 277 may be fixedly coupled to the portable generator system 212 and define a second eyelet having a second passage.

The sleeve 256 may illustratively have a tubular body having a first end and a second end. According to one example, the sleeve 256 may be securably attached to the portable generator system 212. In the example shown, the sleeve 256 may be welded or otherwise secured to a housing 280 of the portable generator system 212. The locking apparatus 210 according to the example shown in FIG. 8 is adapted to rotate about an axis 290 generally parallel to ground.

Figure 9:
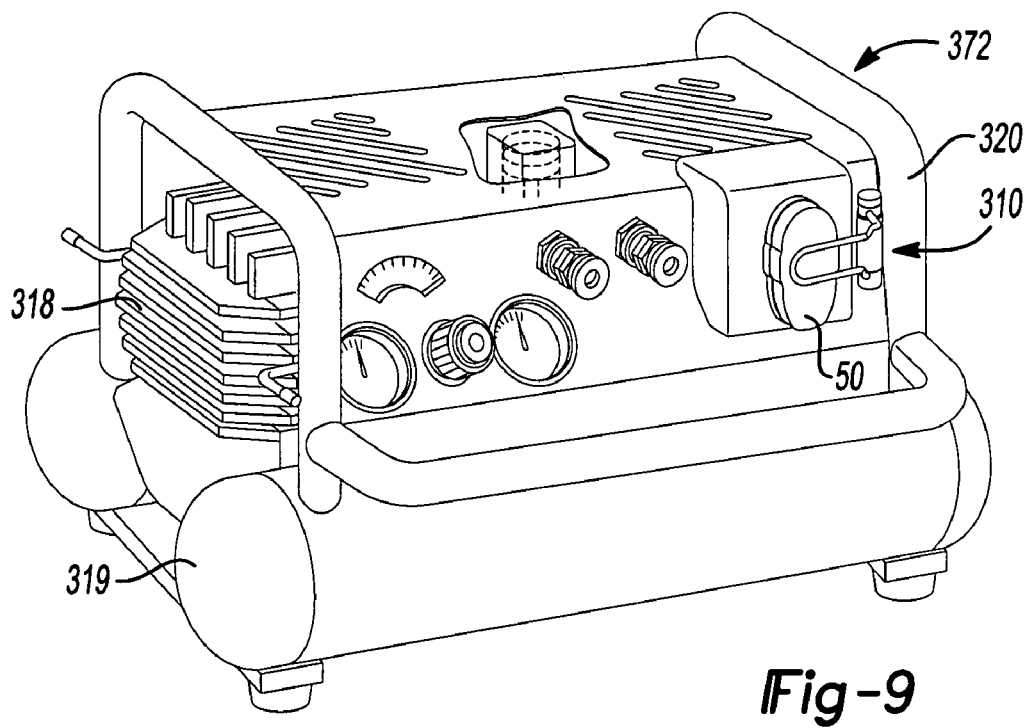
FIG. 9 is a perspective view of an air compressor having a locking apparatus that blocks removal of a battery pack from a receptacle when in a locked position.

FIG. 9 shows a portable power driven device that is a portable air compressor system 312 having a locking apparatus 310. The portable air compressor system 312 can include a frame 320 that supports an internal combustion engine 318, an air compressor (hidden from view in FIG. 9) and an air tank 319 having an inlet coupled to an outlet of the air compressor. The air compressor is driven by an output shaft of internal combustion engine 318. A battery receptacle (such as battery receptacle 48 shown in FIG. 3) may be electrically coupled to an electrically powered starting device for starting the internal combustion engine 318. Locking apparatus 310 is substantially identical to locking apparatus 10 discussed above, so is not described in any further detail.

Figure 10:
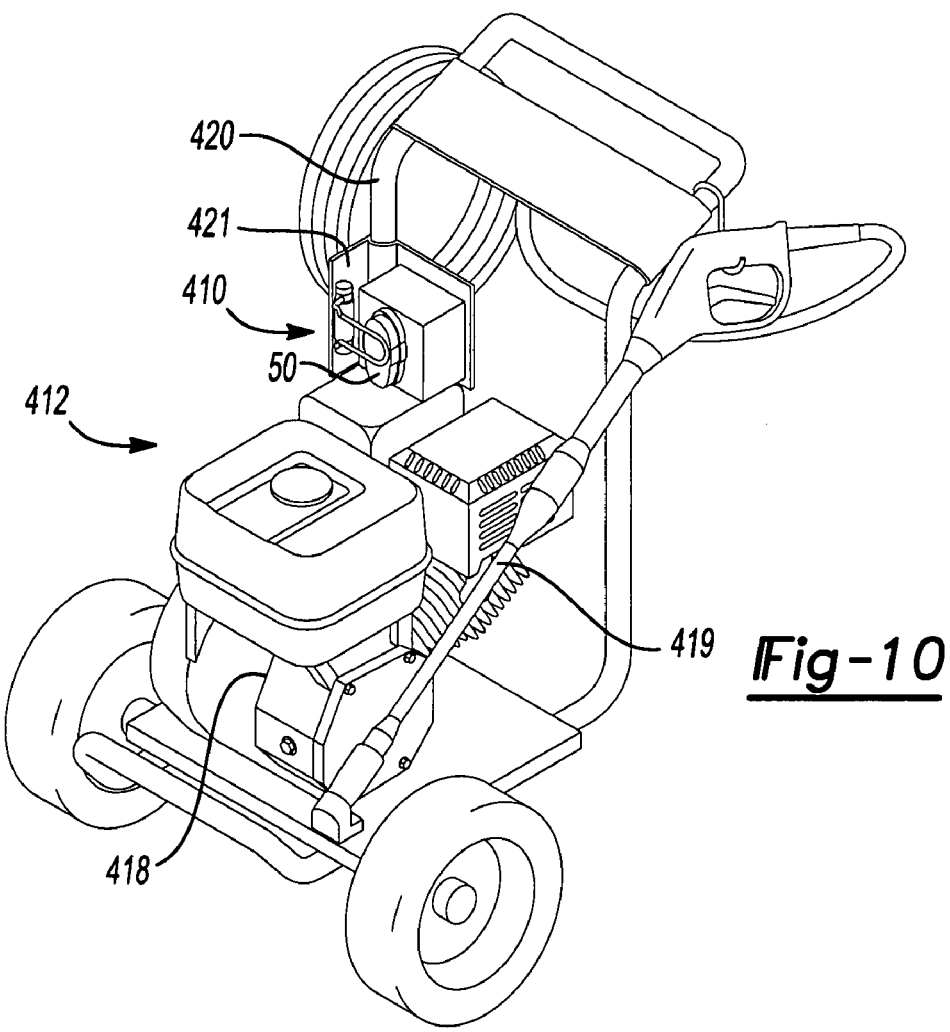
FIG. 10 is a perspective view of a power washer having a locking apparatus that blocks removal of a battery pack from a receptacle when in a locked position.

FIG. 10 shows a portable power driven device that is a power washer 412 having a locking apparatus 410. The power washer 412 can include a frame 420 that supports an internal combustion engine 418 and drives an output device such as a pump having an outlet coupled to a movable spray wand 419. The locking apparatus 410 may illustratively be securably coupled to a bracket 421 secured on the frame 420. A battery receptacle (such as battery receptacle 48 shown in FIG. 3) may be electrically coupled to an electrically powered starting device for starting the internal combustion engine 418. Locking apparatus 410 is substantially identical to locking apparatus 10 discussed above, so is not described in any further detail.

FIG. 11 shows a power driven device having a locking apparatus 510. The locking apparatus 510 can include a rotating reinforced cover or guard 554. The locking apparatus 510 operates substantially similar to the locking apparatus 10 described above. The locking apparatus 510 can substantially surround an exposed portion of the battery 50 to provide added protection to the battery 50 such as from exposure to bad weather or damage on the jobsite.

It is appreciated that the locking apparatus 10 can be adapted for use with other types of power driven devices having a battery started engine where a portable battery pack is utilized, or any other device that utilizes a portable battery pack where preventing theft of the portable battery pack is of concern.

Those skilled in the art can now appreciate from the foregoing description that the broad teachings of the present invention can be implemented in a variety of forms. Therefore, while this disclosure has been described in connection with particular examples thereof, the true scope of the present teachings should not be so limited since other modifications will become apparent to the skilled practitioner upon a study of the drawings, specification and following claims.

What is claimed is:

1. A portable power driven system having a battery started engine and a receptacle for receiving a battery pack comprising:
    a locking apparatus cooperating with the battery pack and adapted to receive a lock in a locked position, comprising:
    an arm disposed on the portable power driven system and movable between the locked position wherein the battery pack is blocked from withdrawal from the power driven system by the arm and an unlocked position;
    a first locking member fixedly coupled to the arm and defining a first opening;
    a second locking member fixedly coupled to the portable power driven system and defining a second opening; and
    wherein in the locked position, the first and second openings substantially align such that the lock may be passed through both the first and second openings thereby precluding movement of the arm toward the unlocked position.

2. The portable power driven system of claim 1 including a biasing member that biases the arm toward the locked position.

3. The portable power driven system of claim 1 wherein the arm is pivotal about a pivot shaft between the locked and unlocked positions.

4. The portable power driven system of claim 3, further comprising an elongated sleeve fixedly coupled to the portable power driven system, wherein said pivot shaft is rotatably received within the sleeve.

5. The portable power driven system of claim 4, wherein the elongated sleeve is welded to a frame of the portable power driven system.

6. The portable power driven system of claim 3 wherein the arm is substantially u-shaped.

7. The portable power driven system of claim 6 wherein the arm includes a first and second knuckle formed on opposite ends of the u-shaped arm, wherein the shaft extends through passages formed in the first and second knuckle.

8. The portable power driven system of claim 1 wherein the portable power driven system includes an electrical generator.

9. The portable power driven system of claim 1 wherein the portable power driven system includes an air compressor.

10. The portable power driven system of claim 1 wherein the portable power driven system includes a power washer.

11. A portable power driven system having a battery started engine and a receptacle for receiving a battery pack comprising:
    a locking apparatus including a barrier member disposed on the portable power driven system
    a first locking member fixedly coupled to the barrier member and defining a first opening;
    a second locking member fixedly coupled to the portable power driven system and defining a second opening;
    wherein the barrier member is movable between a locked position wherein the battery pack is blocked from withdrawal from the power driven system by the barrier member and an unlocked position wherein the battery pack is unobstructed from withdrawal from the power driven system; and
    wherein in the locked position, the first and second openings of the first and second locking members substantially align such that a lock may be passed through both the first and second openings thereby precluding movement of the barrier member toward the unlocked position.

12. The portable power driven system of claim 11 including a biasing member that biases the barrier member toward the locked position.

13. The portable power driven system of claim 11 wherein the barrier member is pivotal about a pivot shaft between the locked and unlocked positions.

14. The portable power driven system of claim 13, further comprising an elongated sleeve fixedly coupled to the portable power driven system, wherein said pivot shaft is rotatably received within the sleeve.

15. The portable power driven system of claim 14 wherein the elongated sleeve is welded to a frame of the portable power driven system.

16. The portable power driven system of claim 11 wherein the barrier member includes a substantially u-shaped arm.

17. The portable power driven system of claim 16 wherein the arm includes a first and second knuckle formed on opposite ends of the u-shaped arm, wherein the shaft extends through passages formed in the first and second knuckle.

18. The portable power driven system of claim 11 wherein the barrier member includes a cover adapted to substantially surround an exposed portion of the battery pack in the locked position.

19. The portable power driven system of claim 11 wherein the portable power driven system includes an electrical generator.

20. The portable power driven system of claim 11 wherein the portable power driven system includes an air compressor.

21. The portable power driven system of claim 11 wherein the portable power driven system includes a power washer.

22. A portable power driven system having a battery started engine and a receptacle for receiving a battery pack comprising:
   a locking apparatus adapted to receive a lock in a locked position, comprising:
      an arm disposed on the portable power driven system and movable between the locked position wherein the battery pack is blocked from withdrawal from the power driven system by the arm and an unlocked position;
      an eyelet formed on the arm and defining an opening; and
      wherein in the locked position, the lock is passed through the opening and around a portion of the power driven system thereby precluding movement of the arm toward the unlocked position.

23. The portable power driven system of claim 22 wherein the arm is biased toward the locked position.

24. The portable power driven system of claim 2 wherein the portable power driven system includes an electrical generator.

25. The portable power driven system of claim 22 wherein the portable power driven system includes an air compressor.

26. The portable power driven system of claim 22 wherein the portable power driven system includes a power washer.

\* \* \* \* \*

UNITED STATES PATENT AND TRADEMARK OFFICE
CERTIFICATE OF CORRECTION

| | | |
|---|---|---|
| PATENT NO. | : 7,782,626 B2 | Page 1 of 1 |
| APPLICATION NO. | : 11/701893 | |
| DATED | : August 24, 2010 | |
| INVENTOR(S) | : John E. Buck et al. | |

It is certified that error appears in the above-identified patent and that said Letters Patent is hereby corrected as shown below:

Column 8,

Line 12, "claim 2" should be -- claim 22 --.

Signed and Sealed this

Twenty-third Day of November, 2010

David J. Kappos
*Director of the United States Patent and Trademark Office*